United States Patent

[11] 3,585,283

| [72] | Inventor | Michael Graser, Jr.<br>Bedford, Mass. |
|---|---|---|
| [21] | Appl. No. | 860,532 |
| [22] | Filed | Sept. 24, 1969 |
| [45] | Patented | June 15, 1971 |
| [73] | Assignee | General Electric Company |

[54] OPTICAL PROJECTION SYSTEM WITH ENHANCED COLOR RESOLUTION
9 Claims, 3 Drawing Figs.

[52] U.S. Cl. ................................................. 178/5.4
[51] Int. Cl. ..................................................... H04n 9/00
[50] Field of Search ........................................... 178/5.4 BD, 5.4 P

[56] References Cited
UNITED STATES PATENTS

| 3,272,917 | 9/1966 | Good et al. | 178/5.4 BDP |
| 3,305,629 | 2/1967 | True | 178/5.4 BDP |

Primary Examiner—Richard Murray
Assistant Examiner—Barry Leibowitz
Attorneys—Marvin Snyder, W. J. Shanley, Jr., Thomas A. Briody, Oscar B. Waddell and Joseph B. Forman ABSTRACT: In light value projection apparatus employing a medium deformable by a scanning electron beam into a plurality of diffraction gratings, each grating controlling the light of a respective primary color, improved resolution of magenta light is achieved by furnishing only red and blue video signals below a selected cutoff frequency to red and blue modulators respectively, and by furnishing only the red and blue video signals above this frequency or the luminance signals above this frequency, to a magenta modulator. The magenta modulator carrier frequency is selected to exceed the beat frequency between the red and blue diffraction gratings. The red, blue and magenta modulator output signals are combined bore being applied to electron beam deflection plates.

PATENTED JUN 15 1971　　3,585,283

INVENTOR:
MICHAEL GRASER, JR.
BY Marvin Snyder
HIS ATTORNEY.

OPTICAL PROJECTION SYSTEM WITH ENHANCED COLOR RESOLUTION

INTRODUCTION

This invention relates to light valves for optically projecting, in color, images generated electronically on a light controlling layer, and more particularly to a method and apparatus for improving resolution of such images.

One form of light valve suitable for optical projection of electronically generated images onto a remote display surface comprises an evacuated enclosure containing an electron gun in predetermined alignment with a transparent disc. The disc is rotated through a reservoir of light modulating fluid to deposit a continuously replenished layer of fluid on the disc surface. An electron beam, generated by the electron gun, is directed through electrostatic beam deflecting and focusing means and is scanned across a portion of the light modulating fluid layer so as to selectively deform the layer. The fluid deformations thus formed constitute optical diffraction gratings which, in conjunction with a Schlieren optical system, selectively control passage of light from a light source through the disc and through an output window in the enclosure envelope in order to create visible images at a remote display surface on which the light impinges.

Diffraction gratings may be formed by directing the electron beam onto the fluid layer and deflecting the beam across the surface of the layer in successive, substantially parallel paths. Contemporaneously, the speed of deflection along these paths may be varied in a periodic manner at a frequency considerably greater than the frequency of scanning along these paths so as to produce alterations in electrical charges deposited on the fluid layer by the beam when moving along these paths. The concentrations of electrical charge along these paths are attracted to the transparent disc, which is electrically conductive and maintained positive with respect to the electron beam source, to form valleys in the fluid layer substantially orthogonal to the direction of the scanning paths. Hence, as speed of deflection of the electron beam across the surface of the fluid layer is varied, the depth of the valleys formed is correspondingly changed. As a result, rays of light impinging on the surface of the layer are diffracted in planes normal to the longitudinal direction of the valleys in the fluid layer, the diffraction angle being determined by the spacings between adjacent valleys. Intensity of the light thus diffracted is a function of the depth of the valleys.

I order to project three primary colors from a common layer of viscous fluid, the electron beam is made to produce a set of diffraction gratings thereon, each grating corresponding to a respective primary color. The line-to-line spacing of each diffraction grating is different from that of each of the other gratings, thus producing a different angle of light deviation for any given color impinging on the fluid layer. The angle of deviation of any color in the first order diffraction pattern is the angle measured with respect to the undeviated path, the sine of which is equal to the ratio of the wavelength of light of the given color to the line-to-line spacing of the diffraction grating. The sine of the angle of deviation of light of the given color in the second order diffraction pattern is equal to the ratio of twice the wavelength of light of the given color to the line-to-line spacing of the diffraction grating, and so on.

The depth of fluid layer deformation in each diffraction grating is varied in accordance with the density of charge deposited by the electron beam so as to produce corresponding variations in intensity of light passed by the diffraction grating. Light emerging from the diffraction gratings is directed onto an output mask having apertures therein of predetermined extent and at predetermined locations in order to pass the selected primary color components of the image to be displayed. The line-to-line spacing of each of the three primary color diffraction gratings is used to determine the correct width and location of the cooperating slot in the output mask to pass the respective primary color component when a diffraction grating corresponding to that color has been formed in the fluid layer.

The electron beam employed in the system is modulated by a plurality of carrier waves of different, substantially constant frequencies, each frequency corresponding to a respective color component of the image to be displayed. Each of the carrier waves is amplitude modulated in accordance with an electrical signal corresponding to the intensity of the respective color component to form a plurality of superimposed diffraction gratings, each grating having a different line-to-line spacing corresponding to a respective primary color. The depths of the grating lines are varied in accordance with the amplitude of the respective color components. A system of this type is described and claimed in W. E. Good et al. U.S. Pat. No. 3,325,592, issued June 13, 1967, and assigned to the instant assignee.

When white light is passed through a diffraction grating, a series of diffraction spectra, corresponding to the various order diffraction patterns, is produced. In each order, blue light is deviated the least and red light is deviated the most. Thus, if the color components selected are blue, green and red, the carrier frequency employed to write each grating may be selected so that the deviation of blue light by the blue diffraction grating, green light by the green diffraction grating, and red light by the red diffraction grating, are appropriate to place the first order spectra where needed in relation to a light output mask. In order to minimize formation of beat diffraction gratings (which, as a result of interference between the blue and green gratings, can produce objectionable stripes on the projection screen), one of the diffraction gratings is oriented with its lines directed orthogonal to the lines of the other two diffraction gratings. This simplifies the problem of beats in that only two primary diffraction gratings have their lines extending along a common direction. Preferably, and as described in the aforementioned Good et al. U.S. Pat. No. 3,325,592, the green diffraction grating is oriented with its lines directed orthogonal to the lines of the red and blue diffraction gratings in a primary color diffraction system. Accordingly, and as described in detail in U.S. Pat. No. 3,325,592, the gratings corresponding to the red and blue components are formed with their lines orthogonal to the direction of horizontal electron beam scan, while the grating corresponding to the green color component is formed by the lines produced by the horizontal scan of the electron beam.

Although the problem of beat diffraction grating formation is minimized by orienting the green gratings perpendicular with respect to the red and blue gratings, there nevertheless is formed a beat frequency grating by virtue of the superimposition of the red and blue gratings. In a color projection system of the type described in the aforementioned Good et al. U.S. Pat. No. 3,325,592, a carrier frequency for the red component is set at approximately 16 megahertz, while a carrier frequency for the blue component is set at approximately 12 megahertz. Accordingly, a beat frequency of approximately 4 megahertz, representing the difference in frequency between the red and blue carrier waves, is established. This beat frequency is sufficiently low to prevent magenta resolution in the projected image from being as fine as the individual red or blue resolution, even where the 4-megahertz beat frequency is interlaced at field rate, as described in the aforementioned Good et al. U.S. Pat. No. 3,325,592. This limitation occurs only when both a red and blue component are superimposed in the projected image to form a magenta colored area, since it is only during this condition that both red and blue diffraction gratings are present. Nevertheless, although the beat frequency is sufficiently low to limit magenta resolution of relatively fine detail in the projected image, coarse magenta detail is substantially unaffected by the 4-megahertz beat frequency. Accordingly, one object of the invention is to improve magenta resolution of fine detail in the image produced by a color video projection system.

Another object is to improve overall sharpness of the image produced by a color video projector system.

Another object is to minimize the visible effect of beat frequency diffraction gratings in the light modulating medium of a color video projector system.

Briefly, in accordance with a preferred embodiment of the invention, beat frequency diffraction gratings between first and second of three primary color diffraction gratings formed by impingement of an electron beam on the light modulating medium of a color television projection system are minimized by coupling the first and second primary color signals, ranging below a selected cutoff frequency only, to independent first and second primary color electron beam modulators respectively. Video signals ranging above the selected cutoff frequency are coupled to another electron beam modulator representing a fourth color intermediate the first and second primary colors in order to produce a diffraction grating corresponding to the fourth color and thereby avoid generation of beat frequency diffraction gratings by the first and second primary color signals above the cutoff frequency.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENT

Figure 1:
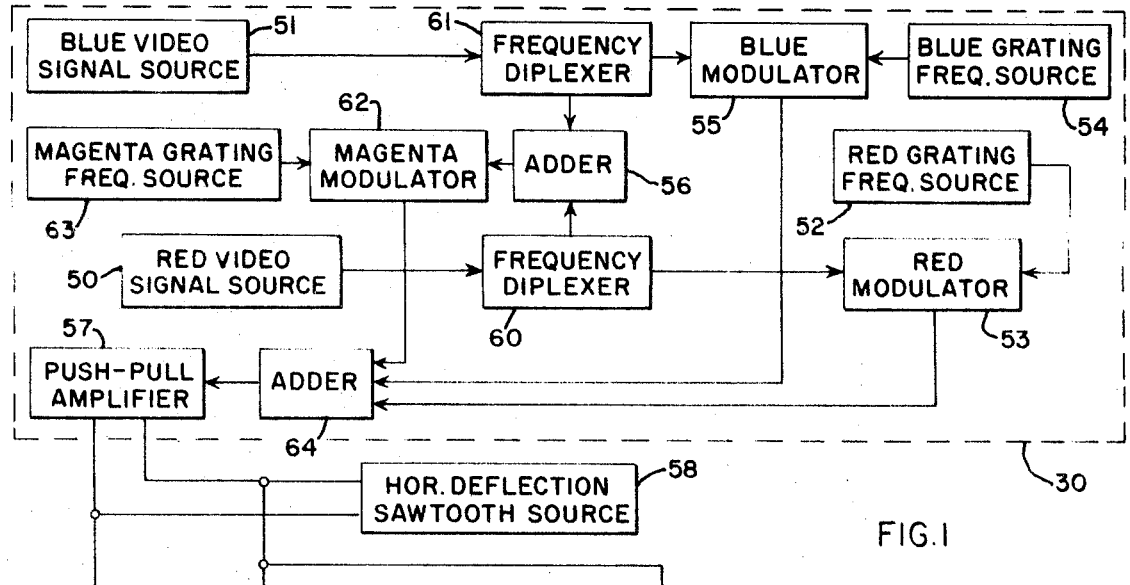
FIG. 1 is a schematic diagram of an optical projection system showing one embodiment, in block diagram form, of circuitry employed in the present invention.
Figure 1:
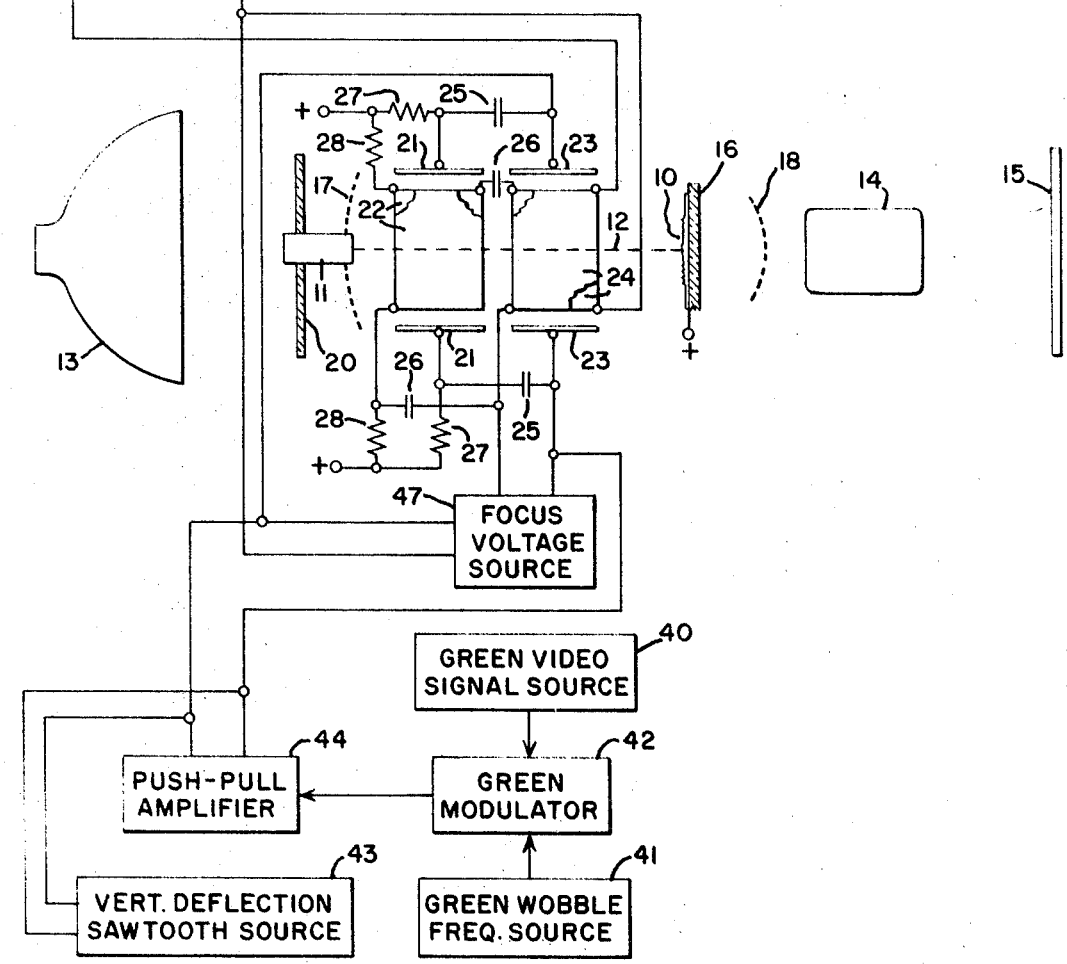

FIG. 1 illustrates a colored image projection system including a light modulating medium 10, such as a fluid of the type described in H. E. Towlson U.S. Pat. No. 3,385,991, issued May 28, 1968 and assigned to the instant assignee, and an electron beam generating device 11, such as an electron gun, producing an electron beam 12 which impinges on medium 10. Medium 10 is supported on an optically transparent substrate 16. Light from a light source 13 is directed onto light modulating medium 10, and light emergent from medium 10 is focused by a projection lens 14 onto a remote screen 15 on which the projected image is displayed. In order to obtain light of the desired characteristics, additional optical elements such as lenticular lenses are employed in the system but, for ease in understanding the invention, are omitted from the description herein. Examples of suitable optical elements for use with the present invention are shown and described in W. E. Good et al. U.S. Pat. No. 3,290,436, issued Dec. 6, 1966, and W. E. Good et al. U.S. Pat. No. 3,330,908, issued July 11, 1967, both of which patents are assigned to the instant assignee.

An apertured light mask 17 is situated on the light input side of light modulating medium 10, while a second apertured light mask 18 is situated on the light output side of light modulating medium 10. Each light mask is comprised of a geometrical configuration of the type illustrated in FIG. 2 and described in detail infra; that is, a plurality of vertically extending parallel slots and opaque bars are situated in the central portion of each mask, and a plurality of horizontally extending parallel slots and opaque bars are situated on either side of the central portion of each mask. A generally circular color filter 20, situated between light source 13 and input mask 17, is constructed with a vertically oriented central portion, corresponding to the central portion of masks 17 and 18, adapted to pass substantially only the red and blue, of magenta, components of white light, and with segments on either side of the central portion, corresponding to the regions of masks 17 and 18 containing the horizontal slots and bars, adapted to pass only the green component of white light.

Light modulating medium 10, with its surface adjacent substrate 16 maintained at positive potential so as to act as an accelerating electrode for electrons emitted by electron gun 11, is deformable by impingement of electron beam 12 thereon. The electron beam is controlled by a pair of vertical deflection plates 21, a pair of horizontal deflection plates 22, a pair of vertical focus and deflection electrodes 23, and a pair of horizontal focus and deflection electrodes 24. Each of vertical focus and deflection electrodes 23 is coupled to one of vertical deflection plates 21 through a blocking capacitor 25, respectively, while each of horizontal deflection plates 22 is coupled to one of horizontal focus and deflection electrodes 24 through a blocking capacitor 26, respectively. These capacitors permit AC voltage on the focus and deflection electrodes to be applied to the deflection plates, while preventing any DC voltage on the focus and deflection electrodes, required in order to maintain the electron beam at a small cross section (a fraction of a a mil in diameter), from reaching the deflection plates. Each of deflection plates 21 and 22 is resistively coupled to a positive potential through a resistance 27 and 28, respectively, so as to prevent any charge buildup on deflection plates 21 and 22 which would interfere with their performance of an electron beam deflection function.

Electron beam deflection voltages, which produce the information necessary for electron beam 12 to deform medium 10 in a manner enabling display of the desired image on remote screen 15, are derived from a received video signal by a red video signal source 50 and a blue video signal source 51, both of which comprise a portion of circuitry 30, and a green video signal source 40. The instantaneous amplitude of each of these signal sources corresponds, respectively, to the intensity of a spot of the respective color in a television image to be projected on screen 15. In addition, signals of constant frequency and constant amplitude are generated by each of a red grating frequency source 52, a blue grating frequency source 54, and a green wobble frequency source 41, and provide a carrier signal to each of a red amplitude modulator 53, a blue amplitude modulator 55, and a green amplitude modulator 42, respectively.

Output signals from red video signal source 50 are furnished to a frequency diplexer 60 which directs signals below a predetermined frequency to red modulator 53, so as to modulate the red grating signal applied thereto, and directs signals above this predetermined frequency to one input of a two-input adder circuit 56. Similarly, output signals from blue video signal source 51 are furnished to a frequency diplexer 61 which directs signals below substantially the same predetermined frequency to blue modulator 55, so as to modulate the blue grating signal applied thereto, while signals above the latter predetermined frequency are directed by frequency diplexer 61 to the second input of two-input adder circuit 56. Adder circuit 56 supplies a modulating signal to a magenta amplitude modulator 62 which receives a constant frequency, constant amplitude carrier signal from a magenta grating frequency source 63.

Output signals from each of red modulator 53, blue modulator 55 and magenta modulator 62 are furnished to respective inputs of a three-input adder circuit 64 which algebraically sums the signals and furnishes the resultant signal to a push-pull amplifier 57. The circuitry for producing the red, blue and magenta amplitude modulated signals, together with amplifier 57, comprises apparatus 30 as shown in a dotted enclosure. Output signals of amplifier 57, together with output signals produced by a horizontal deflection sawtooth voltage source 58, are applied to horizontal focus and deflection electrodes 24.

In similar fashion, output signals of green modulator 42 are furnished to a push-pull amplifier 44, the output of which is coupled to vertical focus and deflection electrodes 23. In addition, a vertical deflection sawtooth voltage source 43 is also coupled to vertical focus and deflection electrodes 23. A focus voltage source 47 furnishes electrical potentials of the proper amplitudes to focus and deflection electrodes 23 and 24 in order to maintain electron beam 12 in the desired focus.

In operation, electron beam 12 is swept, in raster fashion, along the surface of deformable medium 10 by the potentials applied to deflection plates 21 and 22 and focus and deflection electrodes 23 and 24. The beam is swept in a horizontal direction by the voltage produced by horizontal deflection sawtooth voltage source 58 and in a vertical direction by the voltage produced by vertical deflection sawtooth voltage source 43. During horizontal and vertical retrace intervals, the electron beam is blanked by circuitry which, for ease in understanding the invention, is not shown.

Impingement of the electron beam on deformable medium 10 causes formation of a depression in the medium because of the electrical potential thus produced across the medium at the point where the electron beam has struck. As the beam is swept horizontally, the combined video signal corresponding to the sum of the red and blue video signals, each amplitude modulated on a respective carrier signal, is applied to deflection plates 22 and focus and deflection electrodes 24 from push-pull amplifier 57. These signals are thereby superimposed upon the horizontal deflection voltage, causing the horizontal movement of the electron beam to occur at a controllably varying speed. This type of electron beam deflection is known in the art as velocity modulation.

As a result of this velocity modulation, the horizontal motion of the electron beam exhibits intervals in which motion of the beam is alternately slowed and accelerated. These intervals occur at regular locations along each of the horizontal paths of the beam in accordance with each carrier frequency supplied to push-pull amplifier 57. As the beam is swept horizontally, a narrow channel is formed in deformable medium 10 along the path of the beam, due to electrical charge deposition on the surface of the medium. Depth of the channel depends on speed at which the beam is moved; that is, if the beam is deflected rapidly, less charge is deposited along its path than if the beam is deflected more slowly. As amount of charge per unit length along the path of the beam increases, depth of the channel thus formed also increases, and vice versa.

During each of the slowed motion portions of the electron beam horizontal motion intervals, sufficient additional charge is deposited on the surface of deformable medium 10 to cause formation of a depression along the channel being formed by the beam. Accordingly, for each carrier frequency produced by a grating frequency source and furnished to push-pull amplifier 57, a plurality of equally spaced vertical columns of depressions in deformable medium 10 is produced. These columns thus form valleys in the deformable medium so as to comprise vertical optical diffraction gratings. Intensity of light diffracted by the vertical optical diffraction gratings is controlled by depth of the depressions along the horizontal channels in deformable medium 10 which, in turn, are determined by amplitude of the carrier or grating frequency producing the depressions; that is, by amplitude modulating the video signal for a particular color upon the grating frequency or carrier frequency for that particular color, speed of horizontal motion throughout each interval along the horizontal paths of the electron beam is controlled. Since depth of deformation is determinative of intensity of light passing therethrough, the red and blue video signal sources thus control amplitude of the red and blue light, respectively, passing through deformable medium 10.

The green component of light passed by deformable medium 10 is determined by the signal from green video signal source 40 which, in modulator 42, amplitude modulates the signal from green wobble frequency source 41. The output signal of modulator 42 exhibits a constant frequency equal to the carrier frequency of the green wobble frequency source, which produces the green diffraction grating, and an amplitude varying inversely with amplitude of green video signal source 40. This latter signal, amplified by push-pull amplifier 44, is superimposed on the vertical deflection voltage produced by sawtooth source 43, causing the electron beam to "wobble," or move vertically for controllably variable distances at a periodic rate. A uniform spreading or smearing of the charge deposited by the electron beam thus occurs in a direction transvers to the horizontal scanning direction of the beam. With larger amplitude green video signals, carrier amplitude is reduced and more charge is concentrated along the center of the horizontal scanning direction, resulting in a deeper channel in light modulating medium 10 along that part of the horizontal scanning line. Accordingly, the natural horizontal diffraction grating formed by channels produced by the focused electron beam sweeping in a horizontal direction represents maximum green modulation, or light field, and the defocusing during lower amplitude green video signals tends to spread or smear the grating by widening the horizontal channels. For good green dark field, the horizontal diffraction grating is virtually wiped out. Maximum amplitude of wobble is limited to the value required for optimum dark field.

White light from light source 13 is projected onto filter plate 20 which passes only magenta light through its central zone and only green light through sectorial zones at either side of its central zone. The light thus segregated by the filter plate is passed through input mask 17 and focused on the raster area of deformable medium 10 by lenses (not shown).

During presence of uniform charge on its surface, oil film 10 is smooth. However, due to the action of electron beam 12 as it scans over the surface of deformable medium 10, electrical charge is deposited in the previously described manner in order to form three optical diffraction gratings. Two of the diffraction gratings thus formed are vertically disposed and serve to diffract the red and blue portions of the light spectrum respectively. The third grating is horizontally disposed and serves to diffract the green portion of the light spectrum. The three superimposed diffraction gratings thus define the image to be projected on remote display surface 15.

Light from the diffraction gratings on deformable medium 10 is passed through output light mask 18 which is made complementary in configuration to input mask 17 by making the opaque bars on mask 18 correspond to the slots on mask 17, and vice versa. In absence of gratings on deformable medium 10, the slots of input mask 17 are imaged onto the bars of output mask 18. When diffraction gratings are formed on deformable medium 10, light is deviated by the gratings so as to pass through the slots of output mask 18. Light emerging from the slots of output mask 18 is projected by projection lens 14 onto remote display surface 15, forming an image corresponding to the electrical signals producing deformations in deformable medium 10. That is, since the slots and bars of mask 17 and 18 are oriented with respect to each other in a predetermined manner, and since light of various diffraction orders is passed in accordance with diffraction grating geometry, controlled portions of the optical spectrum pass through the grating and mask arrangement to facilitate their optical assembly by projection lens 14 onto display screen 15.

Figure 2:
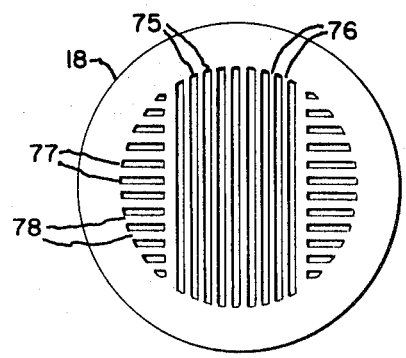
FIG. 2 is a plan view of a light mask employed in the projection system of FIG. 1.

FIG. 2 illustrates an example of output mask 18, showing the centrally located vertical slots 75 separated by vertical bars 76, and the sectorially located horizontal slots 77 separated by horizontal bars 78. Input mask 17 resembles output mask 18, with the exception that the slots and bars are interchanged. Accordingly, in the input mask, regions 75 would comprise vertical bars and regions 76 would comprise vertical slots, while regions 77 would comprise horizontal bars and regions 78 would comprise horizontal slots.

Typically, the carrier frequency of the red component is approximately 16 megahertz, the carrier frequency of the blue component is approximately 12 megahertz, and the carrier frequency of the green component is approximately 48 megahertz. The difference frequency or beat frequency of the red and blue carrier waves is approximately 4 megahertz. This beat frequency is higher than the highest video frequency utilized in the system in order to avoid formation of striation patterns in the projected image. A discussion of striation pattern formation and its elimination is described in W. E. Good et al. U.S. Pat. No. 3,325,592, issued June 13, 1967, and assigned to the instant assignee.

When a pair of phase diffraction gratings oriented in a common direction are superimposed on each other, another diffraction grating, referred to as a beat frequency grating, is inherently formed. The line spacing of the beat frequency grating exceeds the line spacing of either of the other two gratings if the beat frequency itself is lower than the frequency of either of the other two gratings. The green diffraction grating is not involved in formation of beat frequency gratings since the green gratings are oriented in a horizontal direction while both the red and blue gratings are oriented in the vertical direction. However, because the red and blue gratings are both oriented in the same direction, they have a tendency to produce a beat frequency grating. The effect of the beat frequency grating thus formed is to deviate the red and blue components of the magenta light incident thereon less than the deviation of red and blue light resulting from the red and blue gratings respectively. This incompletely deviated light is blocked by output mask 18, since the output mask apertures are selected to pass light deviated by diffraction gratings of predetermined frequency; namely, gratings having a frequency corresponding to the spatial relationship of lines in the diffraction gratings formed by the 12-megahertz and 16-megahertz signals respectively. This blockage results in impairment of proper color rendition as well as loss of useful light.

The effect of the beat frequency grating on the video image is not readily noticable at low red and blue video signal frequencies, since at these frequencies, which may range as high as about 1 megahertz, there is very little detail in the image. However, at the higher frequencies the effects of the beat frequency grating become noticeable and hence objectionable, inasmuch as the higher frequencies represent fine detail in the image and this detail is interferred with or obscured by the effect of the beat frequency grating. Accordingly, the circuitry illustrated in FIG. 1 compensates for the effect of the beat frequency grating by permitting this grating to be produced at low video frequencies but not at the higher video frequencies. The manner in which the circuitry accomplishes this result is set forth below.

In the circuitry of FIG. 1, red and blue video signals of frequency below about 1 megahertz are supplied through frequency diplexers 60 and 61, respectively, to red and blue amplitude modulators 53 and 55, respectively. The amplitude modulated signals produced by the red and blue modulators are algebraically added in adder 64 and furnished to push-pull amplifier 57. This arrangement results in formation of the 4-megahertz beat frequency gratings, discussed supra. Since the video signals thus furnished to modulators 53 and 55 are of low frequencies, the effect of the beat frequency gratings on the red and blue portions of the displayed image is negligible, since it is relatively imperceptible to the eye.

Whenever either the blue or red video signal exceeds approximately 1 megahertz in frequency, the frequency diplexer responsive thereto prevents the video signal from reaching the modulator associated with that color, and instead applies the signal to adder 56. Thus, adder 56 may receive a blue video signal, a red video signal, or both, depending upon the frequencies of these signals. Adder 56 serves to algebraically sum the output signals furnished by either or both of frequency diplexers 60 and 61, and furnishes the resultant signal to magenta amplitude modulator 62 wherein the signal amplitude modulates a magenta carrier frequency produced by magenta grating frequency source 63. Preferably, the frequency of the magenta carrier signal is 8 megahertz, so as to be integrally related to the 12 megahertz blue and 16 megahertz red frequencies. As a result, the limitation imposed by the 4-megahertz beat frequency between the red and blue gratings is removed, and magenta resolution is consequently improved so that overall sharpness of the displayed image is similarly increased. Therefore, by cutting off the red and blue modulators at video frequencies of about 1 megahertz so as to permit reproduction only a large areas in the manner employed previously, the video frequencies above 1 megahertz are supplied to a separate magenta modulator having a carrier frequency which provides a higher magenta grating frequency with concomitantly improved magenta resolution of fine picture detail. The improved horizontal resolution results in sharper images. The output signal produced by magenta modulator 62 is furnished to adder 64 as a convenient way of coupling this signal to push-pull amplifier 57.

Figure 3:
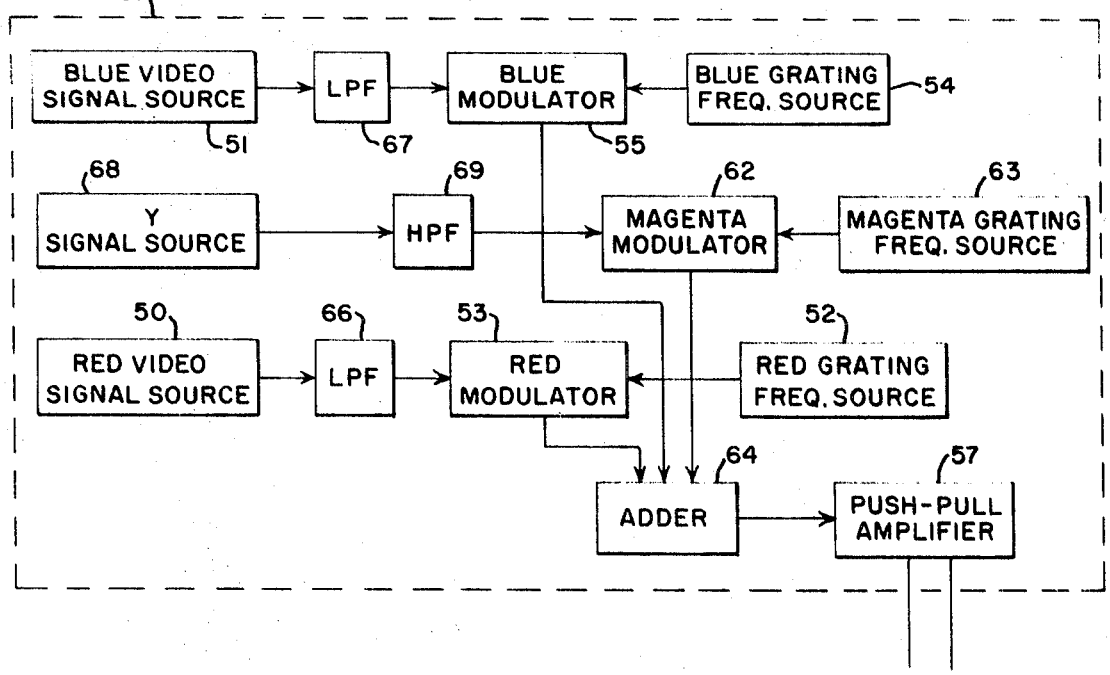
FIG. 3 is a block diagram of a second embodiment of circuitry which may be employed with an optical projection system in accordance with the present invention.

FIG. 3 illustrates a second embodiment of the invention wherein low-pass filters are substituted for the diplexers of FIG. 1 and the modulating signal applied to the magenta modulator is derived from the monochromatic channel, or Y signal source 80. In the NTSC television system, color difference signals (R–Y, B–Y and G–Y, where R, B and G are the red, green and blue color video signals and Y is the luminance signal) are limited to frequencies below a predetermined frequency of about 1 megahertz; above this predetermined frequency, all the picture information is in the Y signal. Therefore, by cutting off the red and blue modulators above the predetermined frequency, only the large areas are reproduced in the manner employed heretofore. By furnishing video frequencies above the predetermined frequency to a separate magenta modulator to which a carrier frequency of 8 megahertz is supplied, improved magenta resolution of the fine picture detail is obtained from the higher magenta grating frequency. The result is better horizontal resolution and sharper images.

In apparatus 31 of FIG. 3, which may be substituted for apparatus 30 in the system of FIG. 1, video signals are furnished from red video signal source 50 and blue video signal source 51 to red modulator 53 and blue modulator 55, respectively, through low-pass filters 66 and 67, respectively. In addition, the luminance signal is furnished from a Y signal source 68 to magenta modulator 62 through a high pass filter 69. Carrier frequencies are furnished to each of modulators 53, 55 and 62 from respective grating frequency sources 52, 54 and 63, while each of the modulators furnishes its amplitude modulated output signal to a respective input of three-input adder 64. Push-pull amplifier 57 drives the appropriate light valve electrodes with the output signal of adder 64.

Operation of the apparatus of FIG. 3 is somewhat similar to operation of circuitry 30, shown in FIG. 1. Thus, the carrier frequencies produced by red grating frequency source 52 and blue grating frequency source 54 are amplitude modulated by signals from red video signal source 50 and blue video signal source 51, respectively, provided the frequencies of the signals produced by source 50 and 51 and below the cutoff frequencies of low-pass filters 66 and 67, respectively. The modulated red and blue grating carrier frequencies are then furnished from red and blue modulators 53 and 55, respectively, to three-input adder 64 wherein they are algebraically summed. Output signals of adder 64 drive the appropriate electrode of the light valve through push-pull amplifier 57. However, red and blue video signals of frequency above the cutoff frequencies of low-pass filters 66 and 67, respectively, are prevented by the respective low-pass filters from amplitude modulating the carrier frequencies produced by red grating frequency source 52 and blue grating frequency source 54, respectively.

High pass filter 69, having a lower cutoff frequency equal to the upper cutoff frequency of low-pass filters 66 and 67, furnishes those signals from Y signal source 68, which are above its cutoff frequency, to magenta modulator 62 in which the carrier frequency produced by magenta grating frequency source 63 is thereby amplitude modulated and supplied to a third input of adder 64. Thus, the high frequency portion of the luminance signal, which contains the information for generating the fine detail of the image, generates a magenta image. This magenta image is more detailed than the magenta image which would otherwise be generated jointly by the red and blue video signal sources since only one grating is involved, instead of two, eliminating the relatively coarse magenta grating which would otherwise be produced by the beat frequency between the red and blue carrier or grating frequencies. While this coarse grating is essentially insignificant at video signal frequencies below the cutoff frequency of low-pass filters 66 and 67 since fine picture detail is not contained in video signals at these frequencies, it does interfere with generation of the image details contained in the higher frequency red and blue video signals. Because this information is also contained in the higher frequency Y signal however, the signals produced by the red and blue video signal sources can be discarded at these frequencies. By supplying from magenta grating frequency source 63 a carrier signal at a frequency of preferably 8 megahertz, a relatively fine magenta grating is produced. The relatively fine magenta grating produces considerably greater image detail than that produced by the relatively coarse magenta grating resulting from the 4-megahertz beat frequency between the red and blue video signal sources. Since the green signal is produced in the manner described in conjunction with the system of FIG. 1, the luminance signal above the lower cutoff frequency of filter 69 produces a luminance image by virtue of the combination of green and magenta light. Accordingly, the fine detail of the image is produced in black and white. As is well known in the art, this does not detract from the color quality of the image since only the relatively broad areas of a conventional television image need be reproduced in color to achieve the illusion that the entire image has been reproduced in color. This phenomenon is described by A. V. Bedford in "Mixed Highs in Color Television," *Proceedings of the I.R.E.*, vol. 38, pp. 1003—1009, Sept. 1950.

The foregoing describes a system for improving magenta resolution of fine picture detail in the image produced by a color video projection system. Generation of beat frequency gratings in the light modulating medium of the color video projection system is minimized, while overall sharpness of the reproduced image is improved.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. In an optical projection system wherein an image to be displayed in color is formed by impingement of an electron beam on a light modulating medium, said electron beam being neglected over the surface of said medium in accordance with three separate signals representing three primary colors respectively, apparatus for improving resolution of the display image, said apparatus comprising:
   means generating four independent carrier frequencies;
   first modulating means modulating a first one of said carrier frequencies with a first one of said three separate signals;
   first electron beam deflection means coupled to said first modulating means for deflecting said electron beam in accordance with the modulated first carrier frequency;
   second modulating means modulating a second one of said carrier frequencies with the second one of said three separate signals whenever said second one of said three separate signals is below a first predetermined frequency;
   third modulating means modulating the third one of said carrier frequencies with the third one of said three separate signals whenever said third one of said three separate signals is below a second predetermined frequency, said second predetermined frequency being substantially equal to said first predetermined frequency;
   fourth modulating means modulating the fourth one of said carrier frequencies with a fourth signal of frequency whenever either of said second and third ones of said three separate signals is above said first and second predetermined frequency, respectively; and
   second electron beam deflection means coupled jointly to said second, third and fourth modulating means for deflecting said electron beam in accordance with the modulated second, third and fourth carrier frequencies.

2. The system of claim 1 including means coupling said second one of said three separate signals to said fourth modulating means whenever the frequency of the second signal exceeds said first predetermined frequency, and means coupling said third one of said three separate signals to said fourth modulating means whenever the frequency of the third signal exceeds said second predetermined frequency.

3. The system of claim 2 wherein said means coupling said second one of said three separate signals to said fourth modulating means and said means coupling said third one of said three separate signals to said fourth modulating means each comprises a frequency diplexer.

4. The system of claim 1 including a first low-pass filter furnishing said second one of said three separate signals to said second modulating means, a second low-pass filter furnishing the third one of said three separate signals to said third modulating means, and a high pass filter furnishing said fourth signal to said fourth modulating means.

5. The system of claim 4 wherein said fourth signal comprises a luminance signal.

6. In an optical projection system wherein an image to be displayed in color is produced by diffraction gratings formed in a light modulating medium in accordance with three separate signals representing three primary colors respectively, a method for improving resolution of the displayed image, said method comprising:
   forming a first diffraction grating in said light modulating medium in accordance with a first one of said three separate signals;
   forming second diffraction grating in said light modulating medium in accordance with a second one of said three separate signals whenever said second one of said three separate signals is within a first predetermined frequency range;
   forming a third diffraction grating in said light modulating medium in accordance with the third one of said three separate signals whenever said third one of said separate three signals is within a second predetermined frequency range substantial coinciding with said first frequency range, said second and third diffraction gratings producing a beat frequency grating therebetween; and
   forming a fourth diffraction grating in said light modulating medium in accordance with a fourth signal of frequency above the frequency of said first and second predetermined frequency ranges whenever either of said second and third ones of said three separate signals is above the frequencies of said first and second predetermined frequency range, respectively, said fourth diffraction grating being of higher grating frequency than said beat frequency grating.

7. In an optical projection system wherein an image to be displayed in color is produced by diffraction gratings formed in a light modulating medium by three separate signals representing three primary colors respectively, said gratings being formed by impingement of an electron beam on said medium, a method for improving resolution of the displayed image, said method comprising:
   deflecting said electron beam along a first direction in accordance with a first one of said three separate signals so as to form a first diffraction grating in said light modulating medium;
   deflecting said electron beam along a second direction in accordance with a second one of said three separate signals whenever said second one of said three separate signals is below a predetermined frequency so as to form a second diffraction grating in said light modulating medium;
   deflecting said electron beam along said second direction in accordance with the third one of said three separate signals whenever said third one of said three separate signals is below said predetermined frequency so as to form a third diffraction grating in said light modulating medium, said second and third diffraction gratings producing a beat frequency grating therebetween; and deflecting said electron beam along said second direction in accordance with a fourth signal of frequency above said predetermined frequency whenever either of said second and third ones of said three separate signals is above said predetermined frequency so as to form a fourth diffraction grating in said light modulating medium, said fourth diffraction grating being of higher grating frequency than said beat frequency grating.

8. The method of claim 7 including the step of deriving said fourth signal from said second and third ones of said three separate signals.

9. The method of claim 7 wherein said fourth signal comprises a luminance signal.